(No Model.)

M. L. NICHOLS.
GEAR CONTAINER AND FRAME CONNECTION FOR BICYCLES.

No. 600,482. Patented Mar. 8, 1898.

Witnesses
John Enders, Jr.
E. S. Poole

Inventor
Marion L. Nichols
by
Frankland Jannus
his Attorney

UNITED STATES PATENT OFFICE.

MARION L. NICHOLS, OF WASHINGTON, DISTRICT OF COLUMBIA, ASSIGNOR TO THE EVOLUTION CYCLE COMPANY, OF SAME PLACE.

GEAR-CONTAINER AND FRAME CONNECTION FOR BICYCLES.

SPECIFICATION forming part of Letters Patent No. 600,482, dated March 8, 1898.

Application filed June 16, 1897. Serial No. 641,011. (No model.)

*To all whom it may concern:*

Be it known that I, MARION L. NICHOLS, a citizen of the United States, residing at Washington, in the District of Columbia, have invented certain new and useful Improvements in Gear-Containers and Frame Connections for Bicycles, of which the following is a description, reference being had to the accompanying drawings, and to the letters of reference marked thereon.

My invention relates to that class of bicycles known as "geared" or "chainless" machines; and the invention consists in a novel construction of center bracket or frame connection which is specially adapted to provide an inclosed space at the most favorable point on the frame of a bicycle to contain the gearing, to connect the converging frame-tubes, and at the same time to provide a support for the bearings for both the driving and driven shafts. These mechanical advantages are combined in a rigid body or construction, to which the frame-tubes are connected and by which they are united, and which also incloses the gearing and supports the bearings for the driving or pedal shaft and the connecting-rod whereby the power is transmitted to the driven wheel. By so combining the mechanical requisites all supplemental extraneous and detachable parts are eliminated, and the frame can be built upon recognized lines with great neatness of effect, since the connecting-shaft extends from the interior of the bracket to the axis of the driven wheel through one of the frame-tubes. The bearings for both the driving and driven shafts being supported in a solid body cannot become displaced and will be securely held in their relative positions, and by combining the necessary supporting, inclosing, and connecting devices in a single body not only are the number of parts reduced but an exceedingly strong and symmetrical construction is secured. That portion of the bracket which is below the bearings of the shafts and the frame connections is made detachable, and by my invention said detachable portion is made of such size as to permit insertion or removal of the gearing, as well as inspection and adjustment.

Figure 1:
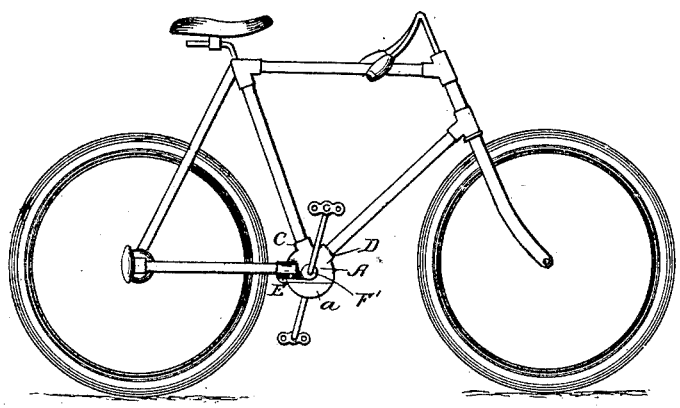
Figure 2:
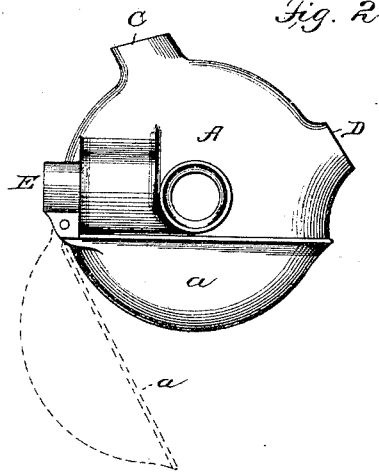
Figure 3:
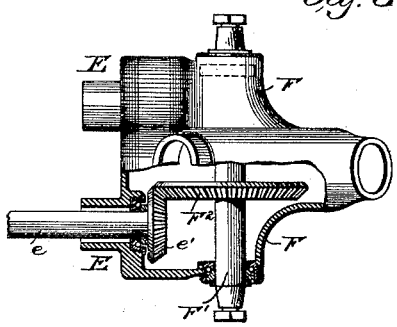
Figure 4:
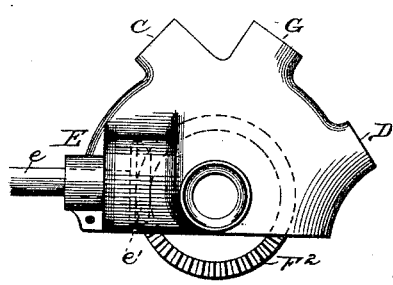

In the accompanying drawings, Figure 1 is a side elevation of a bicycle the frame of which is connected by my improved center bracket. Fig. 2 is a side elevation of the frame connection, showing also in dotted lines the lower part opened. Fig. 3 is a plan or top view of the frame connection detached and partly in section, showing the gearing and also one of the lateral and one of the rearward extensions constructed to receive the ball-casings for their bearings. Fig. 4 is a view of the upper portion of the frame connection, showing the same provided with an additional socket to receive and hold the end of the forwardly-extending brace in a tandem machine.

Referring to the drawings, A indicates the upper or main portion of the cylindrical body which, together with the lateral and rearward extensions, forms the rigid part A, which unites the frame and carries the gearing and bearings, and which may be cast or forged or struck up from any suitable metal, so that the several portions thereof are in fixed relation to each other. The lower detachable portion $a$ of the body completes the desirably cylindrical form thereof and covers and protects the lower part of the gearing and when detached permits free access to the interior, both for adjustment and inspection. The open position of said part $a$ is indicated in Fig. 2 in dotted lines.

The lateral extensions F F are bosses of sufficient size arranged on opposite sides of the body A and are fitted or furnished to form receptacles in the ball-casings of the pedal or driving-shaft F'. The rearward extensions E E are formed or adapted to connect with the inner ends of the rear-fork tubes, and one of said rearward extensions E is also fitted or furnished to form a receptacle for the bearings of the inner end of the connecting-shaft $e$, which said shaft passes through one of the rear-fork tubes to the driving-gear connecting it with the wheel to be driven. The driving-gear $F^2$ on the pedal-shaft F' is housed within the bracket and meshes with and drives the pinion $e'$ on the connecting-shaft $e$, and the bearings for said driving and driven shafts being properly alined their operative relation will be permanent, being both contained in the rigid body A.

The body A is furthermore provided with means for connection with the center and forward frame-tubes, which complete the frame. Lugs C D are indicated as extending from the central line of the body A; but these connections are to be such as are found most desirable in practice, the several parts of the frame being securely attached to the portion A of the bracket, so as to form a strong and rigid construction. Additional connections, as G, are provided, and suitable modifications are made where the bracket forms part of a tandem or of a drop-frame machine requiring additional or fewer frame bars or tubes, and the positions of said connections may be varied as required by the style of the machine to be constructed so long as they are all supported and rigidly held by the said body portion A of the bracket.

It will be noted that by arranging the parts substantially as described all of the frame connections, together with the bearings, are united in the upper portion A of the bracket, so that the lower portion a may be removed without in any manner disturbing the same.

While I have shown the invention in only one form, it will be understood that the construction may be modified by those skilled in the art in view of the foregoing and without departing from the invention so long as the principal features thereof are retained—namely, those embodied in a center bracket and frame connection in the form of a part or piece adapted to contain and protect the main driving-gear and the pinion meshing therewith, while readily affording access thereto, to support the bearings for the driving or pedal shaft and the driven or connecting shaft in fixed relation, and at the same time to constitute in itself a connecting-piece for the converging frame-tubes.

Having described my invention, what I claim is—

1. In a bicycle driven by gearing and a connecting-shaft between the crank-shaft and the driven wheel, a frame connection or bracket the upper portion of which comprises a continuous rigid hollow container for the driving and driven gears, a support for the bearings of the driving and driven shafts, and a connection for the converging frame-tubes secured thereto.

2. In a bicycle driven by gearing and a connecting-shaft between the crank-shaft and the driven wheel, a frame connection or center bracket, the upper portion of which comprises a rigid hollow body adapted to protect and contain the driving and driven gears, and the bearings for the driving and driven shafts, and to form a unitary support therefor, and for the inner or converging ends of the frame-tubes which are secured to said upper portion, and a hollow detachable lower portion.

3. In a bicycle driven by gearing and a connecting-shaft between the crank-shaft and the driven wheel, a frame connection or center bracket comprising a substantially cylindrical hollow body adapted to contain the driving and driven gears and formed with a detachable portion below the axial line thereof, said upper portion forming a rigid body adapted to support the bearings for the crank and connecting shafts and to connect the converging frame-tubes.

In testimony whereof I hereto affix my signature in presence of two witnesses.

MARION L. NICHOLS.

Witnesses:
 FRANKLAND JANNUS,
 JOS. H. BLACKWOOD.

It is hereby certified that the assignee in Letters Patent No. 600,482, granted March 8, 1898, upon the application of Marion L. Nichols, of Washington, District of Columbia, for an improvement in "Gear-Containers and Frame Connections for Bicycles," should have been described and specified as *The Evolution Cycle Company, of same place, a corporation of Virginia*, instead of " The Evolution Cycle Company, of same place; and that the said Letters Patent should be read with this correction therein that the same may conform to the record of the case in the Patent Office.

Signed, countersigned, and sealed this 15th day of March, A. D., 1898.

[SEAL.]

WEBSTER DAVIS,
*Assistant Secretary of the Interior.*

Countersigned:
C. H. DUELL,
*Commissioner of Patents*